United States Patent
Funk

(10) Patent No.: US 8,809,699 B2
(45) Date of Patent: Aug. 19, 2014

(54) JUNCTION BOX AND SOLAR CELL ARRAY

(75) Inventor: Karsten Funk, Weimar (DE)

(73) Assignee: Robert Bosch GmbH, Stuttgart (DE)

( * ) Notice: Subject to any disclaimer, the term of this patent is extended or adjusted under 35 U.S.C. 154(b) by 342 days.

(21) Appl. No.: 13/414,578

(22) Filed: Mar. 7, 2012

(65) Prior Publication Data
US 2012/0227783 A1    Sep. 13, 2012

(30) Foreign Application Priority Data
Mar. 9, 2011 (DE) .................. 10 2011 005 282

(51) Int. Cl.
*H01R 13/502* (2006.01)

(52) U.S. Cl.
USPC ................ 174/562; 439/535; 439/76.1

(58) Field of Classification Search
USPC ............ 174/561, 562, 50; 439/535, 76.1
See application file for complete search history.

(56) References Cited

U.S. PATENT DOCUMENTS

| | | | |
|---|---|---|---|
| 6,344,612 B1* | 2/2002 | Kuwahara et al. | 174/50 |
| 6,655,987 B2* | 12/2003 | Higashikozono et al. | 439/535 |
| 7,097,516 B2* | 8/2006 | Werner et al. | 439/709 |
| 7,444,743 B2* | 11/2008 | Feldmeier et al. | 29/748 |
| 7,763,807 B2* | 7/2010 | Richter | 174/138 F |
| 7,824,189 B1* | 11/2010 | Lauermann et al. | 439/76.1 |
| 8,003,885 B2* | 8/2011 | Richter et al. | 174/50 |
| 8,097,818 B2* | 1/2012 | Gerull et al. | 174/564 |
| 8,410,359 B2* | 4/2013 | Richter | 174/50 |

FOREIGN PATENT DOCUMENTS

DE    20 2009 007 318    8/2009

* cited by examiner

*Primary Examiner* — Hung Ngo
(74) *Attorney, Agent, or Firm* — Kenyon & Kenyon LLP

(57) ABSTRACT

A junction box of a solar cell array/solar module, having a plurality of solar cells connected in multiple strings and including a separate top part mechanically connected to a bottom part, and in one of the bottom and top parts, first contact elements, some being connected in the installed state to solar cells and two of which are connected to a connecting cable of the solar cell array, and in another one of the bottom and top parts, interconnected second contact elements electrically contact first contact elements in the installed state and join them are situated there, and an actuator for releasing the mechanical connection between the bottom and top parts, for completely separating the top and bottom parts and for disconnecting the contact between the first and second contact elements and a control unit assigned to the actuator at the input side for generating an actuator control signal.

13 Claims, 3 Drawing Sheets

JUNCTION BOX AND SOLAR CELL ARRAY

RELATED APPLICATION INFORMATION

The present application claims priority to and the benefit of German patent application no. 10 2011 005 282.8, which was filed in Germany on Mar. 9, 2011, the disclosure of which is incorporated herein by reference.

FIELD OF THE INVENTION

The present invention relates to a junction box of a solar cell array, in particular of a solar module having a plurality of solar cells interconnected in multiple strings, the junction box including a bottom part and a separate top part connected mechanically to the bottom part. It additionally relates to a solar cell array equipped with such a junction box.

BACKGROUND INFORMATION

Crystalline solar modules are made of photovoltaic cells connected in series in so-called strings. A typical solar module has 60 solar cells connected in series. These 60 cells are interconnected in three strings of 20 cells each. In today's modules, these strings are bridged in antiparallel using typically one bypass diode each. These bypass diodes have the function of conducting the electric current generated by the unshaded system past the bottleneck created by the shaded cells when one or more cells of a string are in the shade. The diodes transfer the possible electric current reduced due to the shading and conduct it past the shaded cells to thereby prevent the total electric current flow from being limited and thus the total electrical power from being withdrawn from the solar module in the event of (partial) shading. These bypass diodes are in the solar module junction box, a plastic housing in which the solar cell connections from the module are connected to flexible electric cables, which then in turn connect the solar modules to one another.

Numerous variants of the structural embodiment of the junction boxes have become known. They usually include a bottom part applied to the carrier of the solar cell array (specifically the solar module) in which the conductor elements for electrically connecting the strings and also the aforementioned bypass diodes are accommodated, and a cover placed on the bottom part, closing the junction box and protecting the electric and electronic components therein.

Current developments now point to the need for a safety shutdown of the solar modules in the event of danger, e.g., in a fire. In one case, traditional safety shutdowns are strand-based, i.e., only one electromechanical switch is used for a number of series-connected modules. Here, a dangerously high voltage may still build up due to the series connection of the modules. In another case, alternative methods make use of the module-based electronic system, which then uses electronic switches. The problem here is that there is no galvanic separation, i.e., if the electronic switch fails, the safety shutdown does not accomplish a complete disconnection, so the system still remains at risk. Other module-based approaches make use of electromechanical switches (for example, a relay) to establish galvanic separation in the event of an alarm. The problem here is that these relays consume electric current even during normal operation.

SUMMARY OF THE INVENTION

According to the exemplary embodiments and/or exemplary methods of the present invention, a junction box having the features described herein is made available. Expedient refinements of the exemplary embodiments and/or exemplary methods of the present invention are the subject matter of the further descriptions herein. In addition, a solar cell array having the features described herein is made available.

The idea of a modular implementation of differentiated connection concepts and function concepts in solar cell arrays, specifically in the conventionally constructed solar modules, belongs to the exemplary embodiments and/or exemplary methods of the present invention in that a first partial functionality is implemented in the junction box bottom part and additional components for implementing a second partial functionality are accommodated in the junction box top part, and the electrical connection of the solar cells is implemented with the aid of the mechanical connection between the top part and the bottom part. (This modularity is fundamentally also possible even with a functional exchange of the bottom part and the top part, although this is not the optimal embodiment from the standpoint of today.)

In addition, the idea of implementing the safety shutdown by releasing the mechanical connection between the junction box bottom part and the junction box top part also belongs to the exemplary embodiments and/or exemplary methods of the present invention, the electrical contacts and connections being interrupted at the same time. This release of the mechanical connection between the two parts is accomplished by an actuator to which a control unit for generating a suitable control signal is assigned at the input side. By releasing and in particular by separating the top part, the electric current flow to the terminals of the solar cell array (and, if necessary, also between their individual cells) is galvanically separated and the array (the module) is efficiently electrically separated from the compound structure of the photovoltaic system.

In an advantageous embodiment of the present invention from the standpoint of safety aspects, it is provided that the actuator and/or the first and the second contact elements are configured in such a way that the release of the mechanical connection between the top part and the bottom part separates the electrical connection of at least one connecting cable from the solar cell array.

In an important embodiment of the present invention, the control unit assigned to the actuator has a sensor (for example, a T sensor) for detecting a state variable of the solar cell array and is configured in such a way that it triggers the actuator in response to a sensor signal, which characterizes an abnormal operating state (e.g., elevated temperature) of the solar cell array.

In other embodiments, it is provided that the control unit assigned to the actuator has a timer or a communication interface and is configured in such a way that it triggers the actuator after a predetermined period of time has elapsed or on reaching a predefined point in time or in response to a trigger signal received via the communication interface. Remote-controlled (emergency) shutdown and/or shutdown controlled to occur at a precise time is/are thus possible.

The communication interface may be, for example, the interface of a conventional infrared remote control but may also be a radio interface of a WLAN or a mobile communication network. The term "timer" should include real-time clocks as well as time-delay elements, which are in turn triggered by another signal generator (sensor or the like).

In an elegant and expedient embodiment, the actuator has a compression spring device, which is pretensioned in the joined state of the top part and the bottom part and is held in the pretensioned state by a fuse element, which is controllable by the control unit. The fuse element specifically has a fuse wire, which may be severed by an electric current flow or may have a tension rod operated electromagnetically or via a bimetal strip or acting in any other manner readily accessible to those skilled in the art.

In one embodiment of the present invention, it is provided that the first and the second contact elements are configured as plug contacts which become engaged when the top part is placed on the bottom part. Here, the first and/or the second contact element(s) may be configured to be yielding, in particular resilient, to achieve a positioning tolerance.

In another exemplary embodiment of the junction box, a latching arrangement is provided for mechanically latching the top part and the bottom part or the top part and a mechanical carrier of the solar cell array, which at the same time hold the first and the second contact elements in engagement with one another. The actuator is then configured in such a way that it is able to overcome the holding force of the latching arrangement.

As pointed out above, the subject matter of the exemplary embodiments and/or exemplary methods of the present invention relates in particular to the junction box of a solar module having a traditional configuration and having solar cells of the crystalline type, which are interconnected to form strings, specifically silicon-based solar cells. Essentially, however, a junction box constructed according to the present invention may also be used as a connector unit for other solar cell arrays, also in combination with solar cells of a fundamentally different type.

Advantages and expedient aspects of the exemplary embodiments and/or exemplary methods of the present invention are also derived from the following description of exemplary embodiments on the basis of figures.

DETAILED DESCRIPTION

Figure 1:
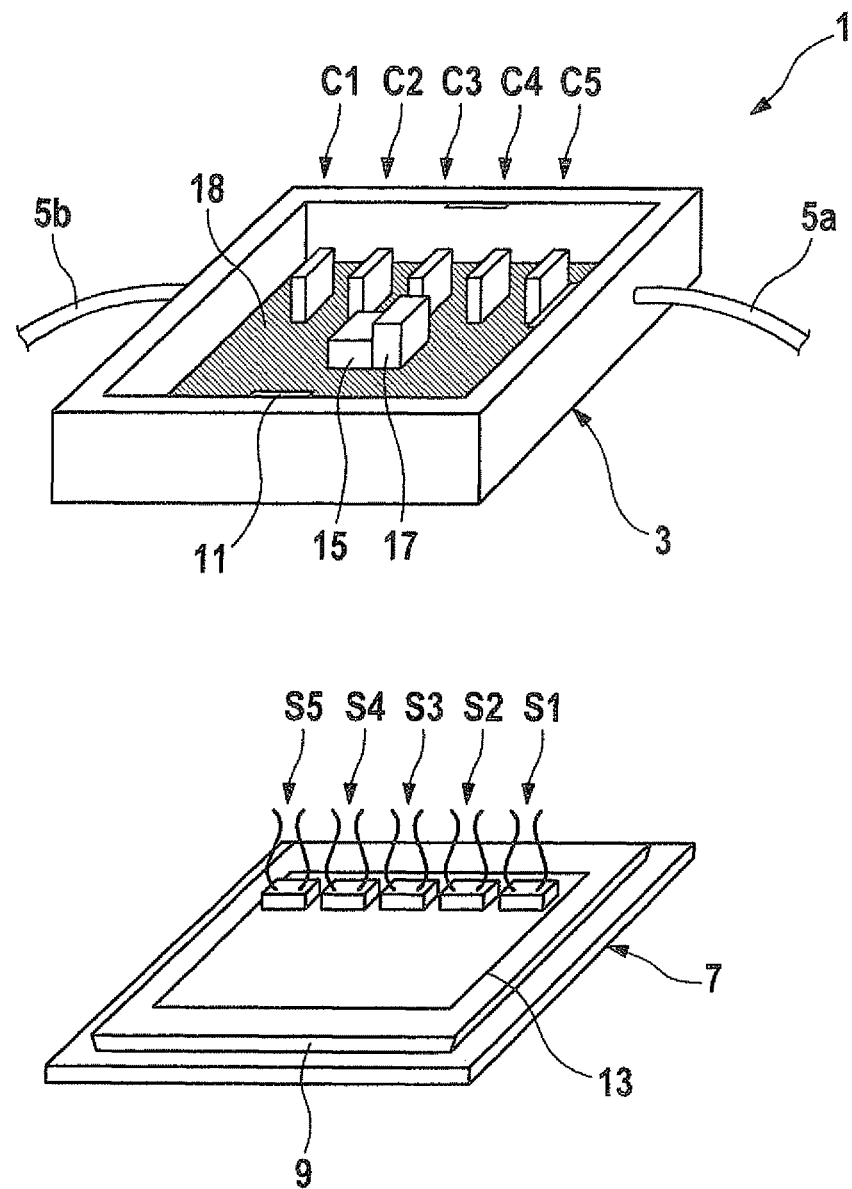
FIG. 1 shows a schematic perspective illustration of the basic configuration of the junction box according to one specific embodiment of the present invention.

FIG. 1 shows a simplified perspective illustration of the parts of a junction box 1 of a solar cell module, namely a bottom part (base body) 3 having connecting cables 5a and 5b and a top part (cover) 7. A peripheral set-back frame 9 on the inside of top part 7 has an undercut edge, so that when the top part is placed on the bottom part, the box is locked in place as soon as the correspondingly shaped (or inserted) protrusions 11 on the top edge of the inside wall of bottom part 3 engage.

Bottom part 3 shows a group of first contact arrangement C1 through C5, while second contact arrangement S1 through S5 are situated in corresponding positions thereto protruding perpendicularly from the inside of top part 7. In the embodiment shown here, first contact arrangement C1 through C5 have essentially a flat cuboid-shape and second contact arrangement S1 through S5 are each formed from a carrier section (not shown in detail) and an omega-shaped contact spring arising out of the former. The contact spring is determined and of such dimensions on the material side that the second contact elements reliably engage with the first contact elements even in the case of low production tolerances in the bottom part and top part, i.e., the contact configurations provided therein, and the electrical contact between the two is maintained having a low contact resistance over a long period of use.

Moreover, the carrier surface of second contact elements S1 through S5 in top part 7 is also configured as a carrier 13 for additional electronic function elements (for example, as a printed circuit board). Terminals C1 through C5 of the junction box are interconnected with the solar cells embedded in the solar module and to the two connecting cables. Terminals S1 through S5 of the cover are interconnected with carrier board 13 of the electronic modules, the carrier board being fastened in the cover.

The figure schematically shows that a control unit 15 and an actuator 17 for emergency shutdown of the solar cell array by separating top part 7 from bottom part 3 are situated inside bottom part 3. In addition, the inside of the bottom of the bottom part is shown to be provided with a signal-colored coating 18, which makes it possible for an observer to recognize even from a relatively great distance if the top part is no longer on the bottom part, in other words, if an emergency shutdown has taken place.

Control unit 15 may include a simple temperature monitoring circuit or may induce a shutdown of the module by remote control in a highly complex operation with a communication interface. Each of the variants may also be combined with module monitoring in which the module temperature and module voltage, for example, are ascertained and relayed to a central evaluation unit. The integrated electronic system may have an individual serial number, which may be queried via an integrated or separate communication interface. Embedding of an RFID chip is also conceivable.

With regard to the mechanical embodiment of the parts of the junction box, there are also numerous possible embodiments, assuming that a secure mechanical closure and a long-term reliable and low-resistance electrical contacting of the first and the second contact elements on the one hand and secure mechanical triggering by the actuator on the other hand are ensured. In addition to latch or snap connections, adhesive connections as well as other connections or combinations of different joining principles may fundamentally be considered for mechanically connecting the housing parts.

Figure 2A:
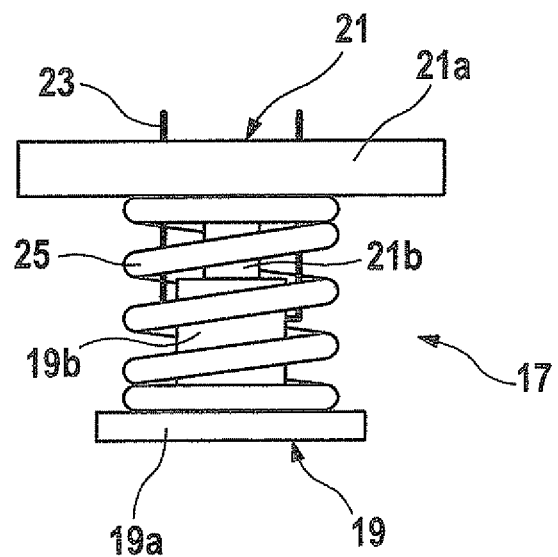
FIGS. 2A, 2B and 2C show detailed views of an actuator according to one specific embodiment of the present invention.
Figure 2B:
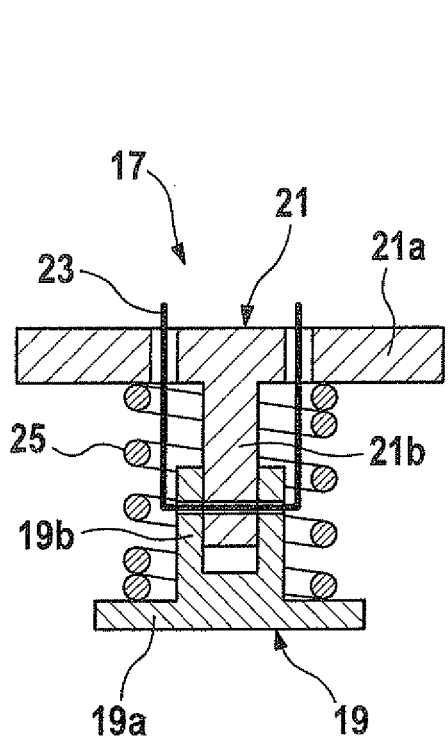
Figure 2C:
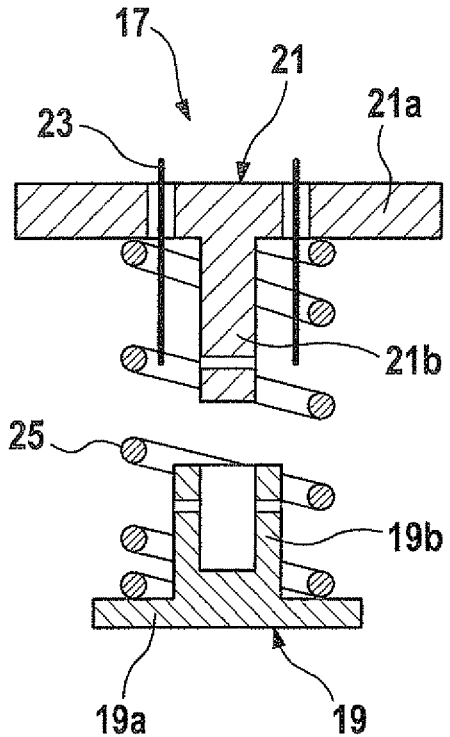

In a side view and cross-sectional illustrations, FIGS. 2A through 2C show, as an exemplary embodiment of an actuator 17, a secured spring-pretensioned pin-and-sleeve system. They are tied into the box construction as explained below with reference to FIGS. 3A and 3B. In this embodiment, actuator 17 includes a sleeve 19b, which is integrally molded on a sleeve base 19a, and with which a pin 21b integrally molded on opposing pin base 21a engages in the untriggered state of the actuator. These parts may be made of plastic.

Holes are provided in the wall of sleeve 19b and in pin 21b and in pin base 21a in such a way that a fuse wire 23 bent in a U shape holds sleeve part 19 and pin part 21 in position relative to one another in the manner best shown in FIG. 2B and secures them there. Both parts 19; 21 are cross-located by a compression spring 25 which is pretensioned and supported between them. As soon as fuse wire 23 has been severed by an appropriately high electric current flow, as shown in FIG. 2C, its fixing effect is canceled and compression spring 25 moves in its relaxed state, thereby pressing parts 19; 21 apart from one another.

Figure 3A:
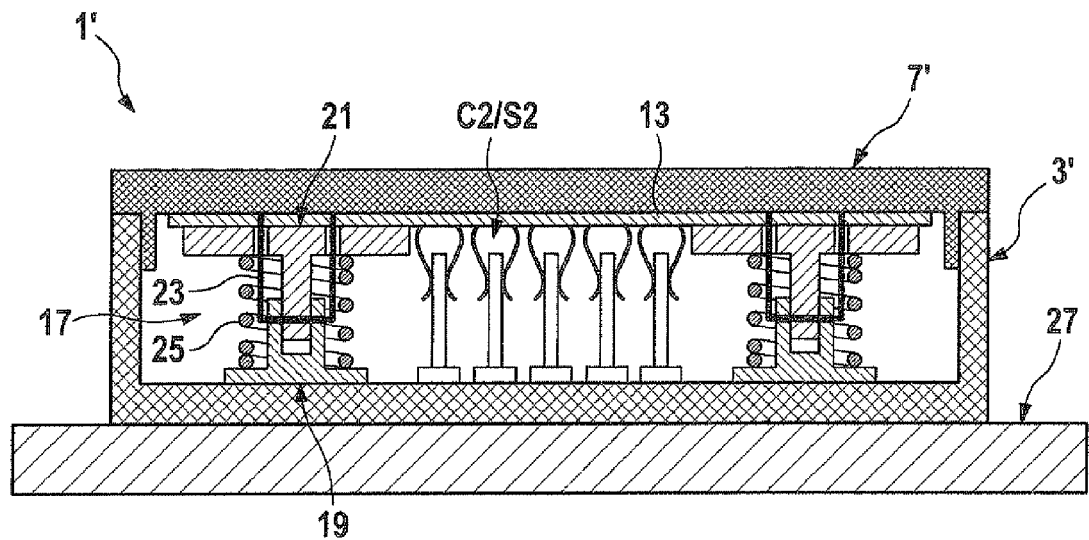
FIGS. 3A and 3B show overall views of a junction box according to the present invention as a schematic longitudinal sectional diagram in two operating states.
Figure 3B:
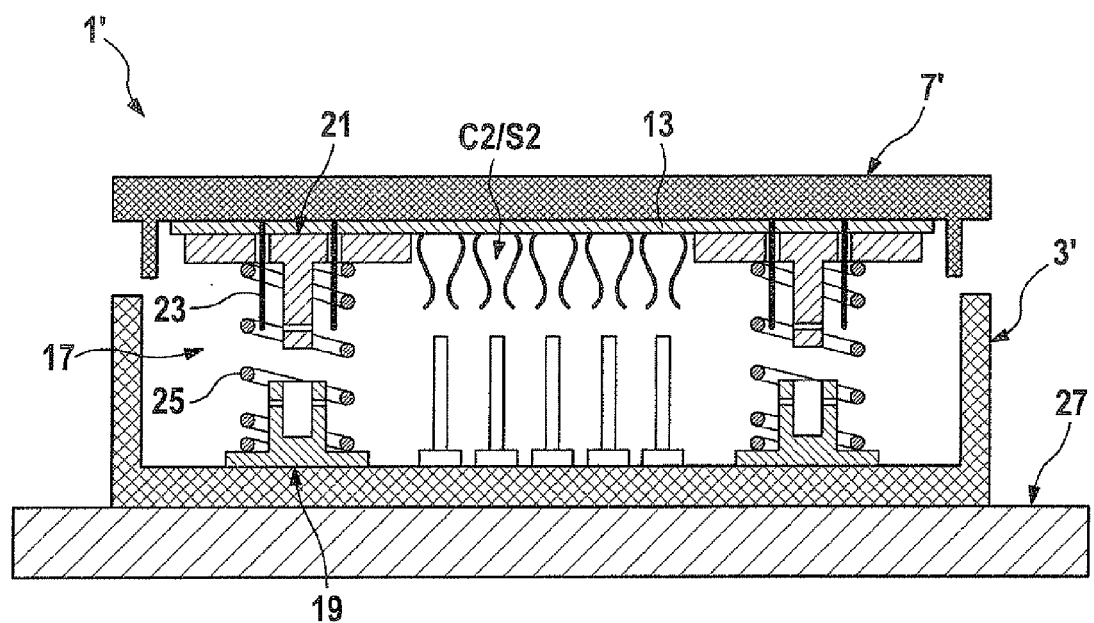

FIGS. 3A and 3B show how this actuator principle functions in a junction box 1' on a solar module 27. The first and the second contact elements are configured as shown in FIG.

1 and are not labeled again with reference numerals in FIGS. 3A and 3B—except for the pair of contact elements C2 through S2.

Junction box 1' according to FIGS. 3A and 3B differs from junction box 1 according to FIG. 1 in that two actuators 17 configured according to FIGS. 2A through 2C are provided. In the embodiment shown here, actuators 17 are reasonably attached to the inner end face of top part 7' and their base 19a of sleeve part 19 rests on the bottom surface of bottom part 3'. When fuse wire 23 is severed, the top part is disconnected from the bottom part (as illustrated in FIG. 3B) and at the same time the second contact elements become disengaged from the first contact elements and the electrical connections, which are present in the engaged state, are interrupted.

The electricity required for operating the control unit and for actuating of the actuator (for severing the fuse wire in the example shown here) may be provided by the solar module itself—this is even more the case since triggering will be necessary in the normal case only during daylight, i.e., in the power state of the solar module. Then again, no power is needed in the triggered state, which represents complete galvanic separation.

The junction boxes may be reused by simply attaching a new cover. The actuators, which were activated in the old cover, may be recycled. Thanks to the modular configuration, the repairs may be accomplished rapidly and in an uncomplicated manner.

In addition to the permanent signal-colored coating inside the junction box bottom part, which is shown in FIG. 1 and is still visible when the top part is disconnected, an arrangement for optical signaling of the triggered state may also be provided in the bottom part, the arrangement being activated only when the connection between the bottom part and the top part has been released, such as a container having a colored powder or a colored liquid, which is destroyed directly by the actuator or when the top part is disconnected from the bottom part, thereby releasing its contents.

Moreover, the exemplary embodiments of the present invention is not limited to the examples elucidated above and the aspects already emphasized but instead a plurality of modifications, which are within the scope of technical expertise, is also possible.

What is claimed is:

1. A junction box of a solar cell array, comprising:
    a plurality of solar cells interconnected in multiple strings; and
    a junction box arrangement, including:
        a bottom part and a separate top part mechanically connected to the bottom part, and first contact elements in one of the bottom part and the top part, some of which are connected in the installed state to the solar cells and two of which are connected to a connecting cable of the solar cell array,
        in the other one of the bottom part and the top part, second contact elements which are interconnected and electrically contact the first contact elements and connect them to one another in the installed state, are situated,
        an actuator for releasing the mechanical connection between the bottom part and the top part, for completely separating the top part from the bottom part and for disconnecting the contact between the first contact element and the second contact element, and
        a control unit for generating a control signal for the actuator assigned to the actuator at the input side.

2. The junction box of claim 1, wherein at least one of the actuator and the first contact elements and the second contact elements are configured so that releasing the mechanical connection between the bottom part and the top part separates the electrical connection of at least one connecting cable from the solar cell array.

3. The junction box of claim 1, wherein the control unit assigned to the actuator has a sensor for detecting a state variable of the solar cell array and is configured so that it triggers the actuator in response to a sensor signal, which characterizes an abnormal operating state of the solar cell array.

4. The junction box of claim 1, wherein the control unit assigned to the actuator has one of a timer and a communication interface and is configured so that it triggers the actuator after a predetermined period of time has elapsed or on reaching a predefined point in time or in response to a trigger signal received via the communication interface.

5. The junction box of claim 1, wherein the actuator has a compression spring device, which is pretensioned by the bottom part and top part in the joined state and is held in the pretensioned state by a fuse element controllable by the control unit.

6. The junction box of claim 5, wherein the fuse element has a fuse wire, which is severable by an electric current flow.

7. The junction box of claim 1, wherein the first contact elements are situated in the bottom part and are fixedly connected to the solar cells, to the strings of the solar module, in its state of having been placed upon the solar cell array, and the second contact elements are situated in the top part.

8. The junction box of claim 1, wherein the first contact elements and the second contact elements are configured as plug contacts, which are engaged with one another when the top part is placed on the bottom part.

9. The junction box of claim 1, further comprising:
    a latching arrangement for mechanically latching the top part and the bottom part there or between the top part and a mechanical carrier of the solar cell array, the latching arrangement at the same time holding the first contact elements and the second contact elements in engagement with one another, and the actuator being configured so that it overcomes the holding force of the latch arrangement.

10. The junction box of claim 1, wherein there is one of a permanent signal identification and a device for generating a signal identification which is activated on release of the mechanical connection between the bottom part and the top part for easy identification of the disconnected state of the top part.

11. The junction box of claim 1, wherein the solar cell array is a solar module.

12. A solar cell array, comprising:
    a junction box, including:
    a plurality of solar cells interconnected in multiple strings; and
    a junction box arrangement, including:
        a bottom part and a separate top part mechanically connected to the bottom part, and first contact elements in one of the bottom part and the top part, some of which are connected in the installed state to the solar cells and two of which are connected to a connecting cable of the solar cell array,
        in the other one of the bottom part and the top part, second contact elements which are interconnected and electrically contact the first contact elements and connect them to one another in the installed state, are situated,
        an actuator for releasing the mechanical connection between the bottom part and the top part, for completely separating the top part from the bottom part and for disconnecting the contact between the first contact element and the second contact element, and a control unit for generating a control signal for the actuator assigned to the actuator at the input side.

13. The solar cell array of claim 12, wherein the solar cell array is a solar module.

* * * * *